O. BROCKMAN.
STUFFING ROD.
APPLICATION FILED MAY 5, 1909.
957,737.
Patented May 10, 1910.
FIG. 5
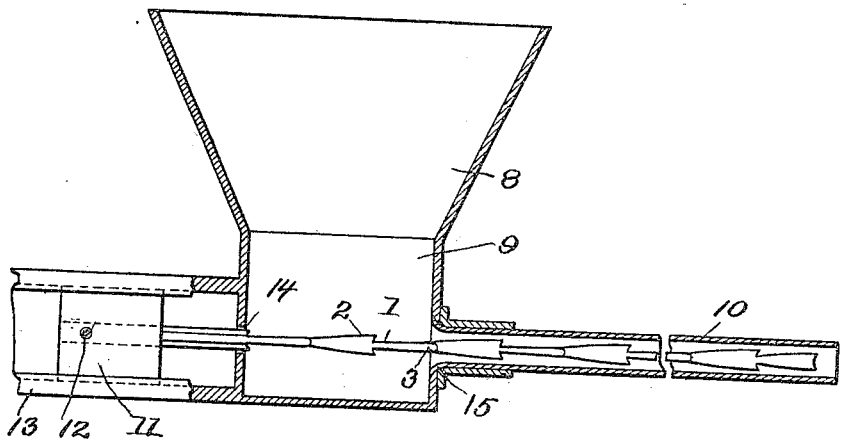
FIG. 1
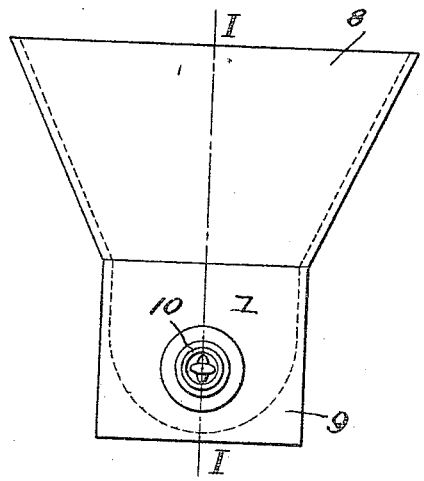
FIG. 2
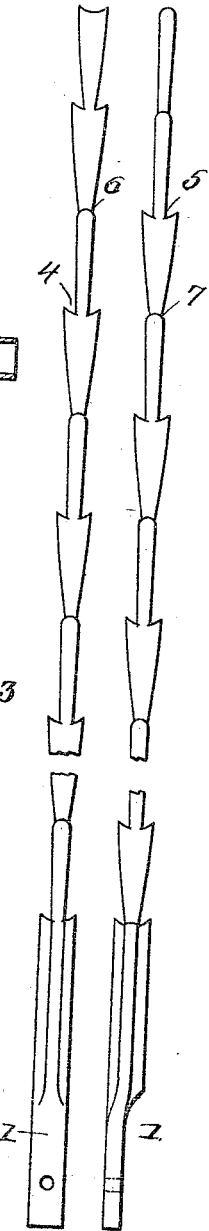
FIG. 3
FIG. 4
WITNESSES:
S. L. Richmond
O. S. Kitchin
INVENTOR
Oscar Brockman
BY
Mason, Fenwick & Lawrence
his ATTORNEY

UNITED STATES PATENT OFFICE.

OSCAR BROCKMAN, OF LOUISVILLE, KENTUCKY.

STUFFING-ROD.

957,737.     Specification of Letters Patent.      Patented May 10, 1910.

Application filed May 5, 1909. Serial No. 494,052.

*To all whom it may concern:*

Be it known that I, OSCAR BROCKMAN, a citizen of the United States, residing at Louisville, in the county of Jefferson and State of Kentucky, have invented certain new and useful Improvements in Stuffing-Rods; and I do hereby declare the following to be a full, clear, and exact description of the invention, such as will enable others skilled in the art to which it appertains to make and use the same.

This invention relates to improvements in machines for stuffing horse collars, pads, and the like, and particularly to an improved toothed or bearded rod.

An object in view is the arrangement of a stuffing rod of improved structure arranged in a tube and feeding chute in such a manner as to permit the rod free access to the feeding chute and to force or draw therefrom the material that is being packed.

A further object of the invention is the provision of a bearded or tooth shaped rod having a plurality of teeth arranged at right angles to each other and positioned alternately along the rod, in combination with a feeding chute and guiding tube by which the material being stuffed or packed may be fed in a loose, or any desired state, through the guiding tube into the article being packed.

With these and other objects in view the invention comprises certain novel constructions, combinations and arrangement of parts as will be hereinafter more fully described and claimed.

In the accompanying drawings: Figure 1 is a fragmentary, sectional view through a stuffing machine embodying the invention. Fig. 2 is an end view of the structure shown in Fig. 1. Fig. 3 is a side elevation of the stuffing rod. Fig. 4 is a view of the stuffing rod taken at right angles to Fig. 3. Fig. 5 is an end view of the stuffing rod shown in Fig. 3.

In the construction of stuffing machines various means have been provided, including toothed stuffing rods for packing various kinds of materials that have been previously prepared. The present invention relates to this class of structures, but is formed with an improved toothed rod having the teeth set at right angles to each other and one behind the other. Also the teeth are formed with rounded ends and beveled surfaces which permit the packing of the material in a loose state without previously being prepared. By the arrangement of feeding chute and tubular construction of rod having teeth at right angles to each other and formed with beveled surfaces and arc shaped ends that are rounded off, waste straw, tangled and in its original shape may be easily and quickly packed as well as other kinds of materials, either in a prepared or an unprepared state may be packed without injury to the machine or material and be efficiently and correctly packed.

In order that the invention may be more clearly understood an embodiment of the same is shown in the accompanying drawings in which—

1 indicates a stuffing rod having teeth or projections 2 and 3, the tooth or projection 3 extending at a right angle to tooth or projection 2. The teeth or projections 2 and 3 are positioned at right angles to each other and may be made of any desired length, and any desired number of the same may compose the rod 1. The teeth 2 and 3 are formed concave at 4 and 5 respectively, and are rounded at their ends 6 and 7 respectively so as to catch material placed in chute 8 and force it downward into receptacle 9 which is an extension of chute 8 through which rod 1 passes. The concave ends 4 and 5 cause the ready catching or engaging of material and the rounded portions 6 and 7 prevent any cutting or tearing of the material. The top or edges of the teeth 2 and 3 are tapered so as to allow for clearance on the return stroke of the rod, which is adapted to reciprocate in housing 9, and also pipe 10. The teeth being tapered on the sides and rounded on the ends form a point with the concave portions 4 and 5 for catching or snatching the straw in the housing 9, as the same is pressed against rod 1, and carries it through pipe 10 with a comparatively short reciprocatory stroke of the rod, the straw or material being packed being passed from one set or gang of teeth to the other until punched out at the end of the tube or pipe 10 into the pad or other device being packed. The rod 1 is connected to a reciprocating member 11 by any desired means, as for instance, set screw 12. The reciprocating member 11 is guided by guides 13 which are supported in any desired manner. The reciprocating member 11 may be operated by an engine or any other means for reciprocating rod 1, at any desired speed or any desired length of stroke, preferably the length of the stroke being comparatively short. The rod 1 passes through an opening 14 in housing 9 which acts as a guide for assisting in properly holding rod 1 to its work. Pipe 10 may be of any desired structure but is preferably bell shaped at 15 for admitting more freely the material being packed.

What I claim is:

1. In a stuffing machine, the combination with a chute and a pipe, of a stuffing rod, a reciprocating member connected with the stuffing rod, guides connected with the chute and adapted to receive and guide the reciprocating member, the stuffing rod positioned within the pipe and having formed thereon a plurality of pairs of projections, each pair of projections being arranged to alternate upon the rod with its adjacent pair and each projection formed upon the rod at an acute angle thereto, substantially as shown and described.

2. In a stuffing machine, the combination with a chute and a tube, of a stuffing rod adapted to reciprocate within the tube and having formed thereon a series of teeth positioned in alternating pairs at substantially right angles to each other, the teeth of each pair being formed upon opposite sides of the rod and tapering lengthwise thereof, each tooth being set at an angle to the rod for engaging the material being packed.

3. In a stuffing machine, the combination with a tube, and means for directing material thereto, of a stuffing rod adapted to reciprocate in said tube and comprising a plurality of teeth arranged in pairs and extending on each side of said rod, each pair being positioned at substantially a right angle to the adjacent pairs, and each tooth being formed with a concave end and beveled edges for permitting easy grasping of the material being packed and permitting easy rearward movement of the teeth.

In testimony whereof I affix my signature in presence of two witnesses.

OSCAR BROCKMAN.

Witnesses:
W. G. BECKER,
MILLARD DAY.